UNITED STATES PATENT OFFICE.

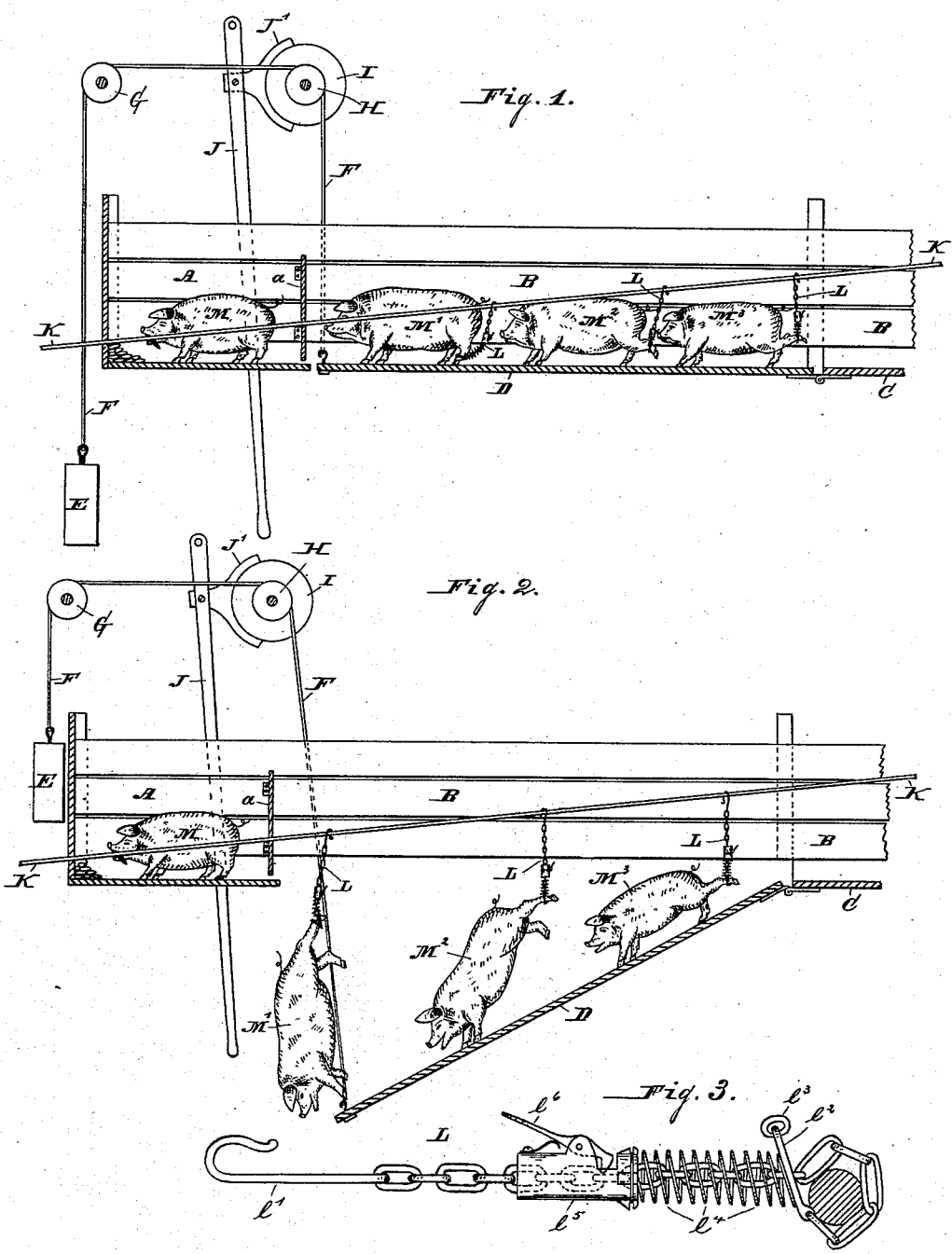

GEORGE A. LOWRY AND MOSES CRAWFORD, OF INDIANAPOLIS, INDIANA.

APPARATUS FOR CATCHING AND SUSPENDING HOGS.

SPECIFICATION forming part of Letters Patent No. 252,112, dated January 10, 1882.

Application filed September 12, 1881. (No model.)

*To all whom it may concern:*

Be it known that we, GEORGE A. LOWRY and MOSES CRAWFORD, of the city of Indianapolis, county of Marion, and State of Indiana, have invented certain new and useful Improvements in Apparatus for Catching and Suspending Hogs, of which the following is a specification.

Our said invention consists principally of the combination, with a chute for hogs, of a rod or bar to which they may be suspended, a means of attaching the hogs to said bar, and a section of floor adapted to be lowered so as to throw the weight of the hogs thereon onto the bar, and to be raised for the reception of other hogs.

It further consists of the combination, with this or a suitable arrangement, of a pen containing a decoy-hog.

It further consists of a peculiar means of securing the hog's leg to the chain by which he is suspended, all as will hereinafter be more particularly set forth.

Referring to the accompanying drawings, which are made a part hereof, and on which similar letters of reference indicate similar parts, Figure 1 is a longitudinal vertical section of the chute, &c., the movable floor-section being in its ordinary position, level with the other portions of the floor, with several hogs standing thereon; Fig. 2, a similar view when the floor is in lowered position, the hogs being in the various positions into which they would naturally fall during the lowering operation; and Fig. 3, a detail view of the suspending-chain and the spring-clamp by which the hook is held in place when the chain is hooked around the leg of the hog.

In said drawings, the portions marked A represent the pen for the decoy-hog; B, the sides of the chute; C, the stationary portion of the floor thereof; D, the movable portion of the floor; E, a counterbalancing-weight for said movable floor-section; F, a rope carrying said weight; G H, pulleys over which said weight runs; I, a brake-wheel on the same shaft as the pulley H; J, a brake-lever, and J' a brake-shoe therefor; K, the rod or bar on which the animals are suspended; L, the chain by which the hogs are secured to said bar; M, the decoy hog, and M' M², &c., the hogs which are being handled by the use of our invention.

The operation of our said invention is as follows: A hog, M, is first put into the pen A, (which is simply a portion of the chute divided from the main portion thereof by a gate, $a$,) and food may be placed before him. It is a peculiarity of hogs that they are only to be driven with exceeding difficulty over any new and untried path; but when one has with apparent safety reached a point beyond it, especially if he appears to have found food thereby, others can be made to follow with much less trouble. The hog M therefore acts as a decoy for the others, and much time and labor are thus saved. The hogs M' M², &c., are then driven along the chute upon the trap or falling floor-section D, and the chains L attached to their hind legs and to the bar K. The brake is then manipulated to allow the trap D to slowly descend until the hogs are completely suspended, when they slide off on the bar K to the place where they are to be killed, the brake meantime being applied, so that the trap shall not fly up too quickly. When the hogs are all out of the way the brake is released and the trap is drawn back to a horizontal position, and the brake is again set tightly against the wheel I. Another lot of hogs is then driven onto the trap and the operation is repeated.

The chute should only be made wide enough for one hog to pass along it at a time, as otherwise the hogs might become too crowded on the trap to be conveniently attached to the bar K.

The chain L is in itself simply a chain having a hook upon each end, one of which, $l'$, hooks over the bar K, and the other of which, $l^2$, when the chain is passed around the leg of the animal, hooks over the main portion thereof. This device alone, however, is liable to be shaken off by the animal before the trap can be dropped. We therefore apply a spring and catch mechanism to hold it in place. This consists of a spring, $l^4$, which either bears directly against the hook itself, as shown, or carries a head which does. A slide, $l^5$, behind and attached to the spring, and a catch, $l^6$, which snaps into or against the ends of the links of the chain, prevent the device receding from its engaged position until said catch is released.

The ring $l^3$ on the end of the hook is simply for convenience in handling the chain.

A traveling car made in a triangular form and set on an inclined track might be used instead of the trap D, and the cord, pulley, counterbalancing-weight, and brake mechanism would be equally applicable thereto, as would also the pen containing the decoy.

Having thus fully described our said invention, what we claim as new, and desire to secure by Letters Patent, is—

1. In apparatus for catching and suspending hogs, a passage-way or chute a portion of the bottom of which consists of a movable hinged door, and a pen, A, for containing a decoy-hog, located at or near the front or free end of said hinged door, and the bottom of which is substantially a continuation of said door when in level position, substantially as set forth.

2. The combination, with the trap-like floor-section and its counterbalancing-weight and the rope and pulleys therefor, of a brake, J', and brake-lever J, by which the same may be held in position or allowed to ascend and descend more or less gradually, substantially as set forth.

3. The combination, with the chain L, having hooks $l'$ and $l^2$, of the spring $l^4$, slide $l^5$, and catch $l^6$, substantially as shown and described, and for the purpose specified.

4. The combination of the chute B, floor C, trap D, suspending mechanism E, F, G, H, I, and J, bar K, and suspending-chain L, forming an apparatus for catching and suspending hogs, substantially as set forth.

In witness whereof we have hereunto set our hands and seals, at Indianapolis, Indiana, this 5th day of September, A. D. 1881.

GEO. A. LOWRY. [L. S.]
    MOSES CRAWFORD. [L. S.]

In presence of—
    A. K. LOWRY,
    C. BRADFORD.